United States Patent [19]
Hollingsworth

[11] Patent Number: 6,157,808
[45] Date of Patent: Dec. 5, 2000

[54] COMPUTERIZED EMPLOYEE CERTIFICATION AND TRAINING SYSTEM

[75] Inventor: Gerald T. Hollingsworth, Toms River, N.J.

[73] Assignee: GPU, Inc., Morristown, N.J.

[21] Appl. No.: 08/893,258

[22] Filed: Jul. 16, 1997

Related U.S. Application Data

[60] Provisional application No. 60/015,722, Jul. 17, 1996.

[51] Int. Cl.[7] .................................................. G09B 3/00
[52] U.S. Cl. .......................................... 434/350; 434/219
[58] Field of Search ..................................... 434/362, 322, 434/323, 219, 350–353, 118, 64, 65, 66, 69

[56] References Cited

U.S. PATENT DOCUMENTS

| | | | |
|---|---|---|---|
| 4,020,468 | 4/1977 | Silver et al. | 340/172.5 |
| 4,671,772 | 6/1987 | Slade et al. | 434/219 |
| 4,863,384 | 9/1989 | Slade | 434/107 |
| 5,208,869 | 5/1993 | Holt | 382/7 |
| 5,251,294 | 10/1993 | Abelow | 395/155 |
| 5,267,865 | 12/1993 | Lee et al. | 434/350 |
| 5,270,920 | 12/1993 | Pearse et al. | 364/401 |
| 5,306,154 | 4/1994 | Ujita et al. | 434/218 |
| 5,326,270 | 7/1994 | Ostby et al. | 434/362 |
| 5,371,673 | 12/1994 | Fan | 364/419.01 |
| 5,416,694 | 5/1995 | Parrish et al. | 364/401 |
| 5,779,486 | 3/1996 | Ho et al. | 434/362 |

*Primary Examiner*—Jessica J. Harrison
*Assistant Examiner*—Sheila Clayton
*Attorney, Agent, or Firm*—William Lawrence Muckëlroy; Gary N. Lipson, Esq.

[57] ABSTRACT

Disclosed is a computer system and a method for a computer-based data integration and management processing system and a method to support an efficient management of employee development, training and performance improvement in a performance-competence based organization. The present invention includes an integrated system that provides an ability to develop training material, career paths or to determine an employee's qualifications and performance. The present invention provides comprehensive support for job and task analysis; learning objective development; standards and processes; objective, reference based test items; examination and evaluations; training program identification and content description; training scheduling; training-evaluation documentation; and reporting. Each job defined in the current system has specific duties, tasks and skills associated with an identified job. Because the specific skills can be represented by accepted standards of certification; the system is able to establish an association between the certifications and employees responsibilities. This association permits the system to instantly identify the level of qualification of any employee and verify that the employee is qualified to perform the duties assigned.

20 Claims, 15 Drawing Sheets

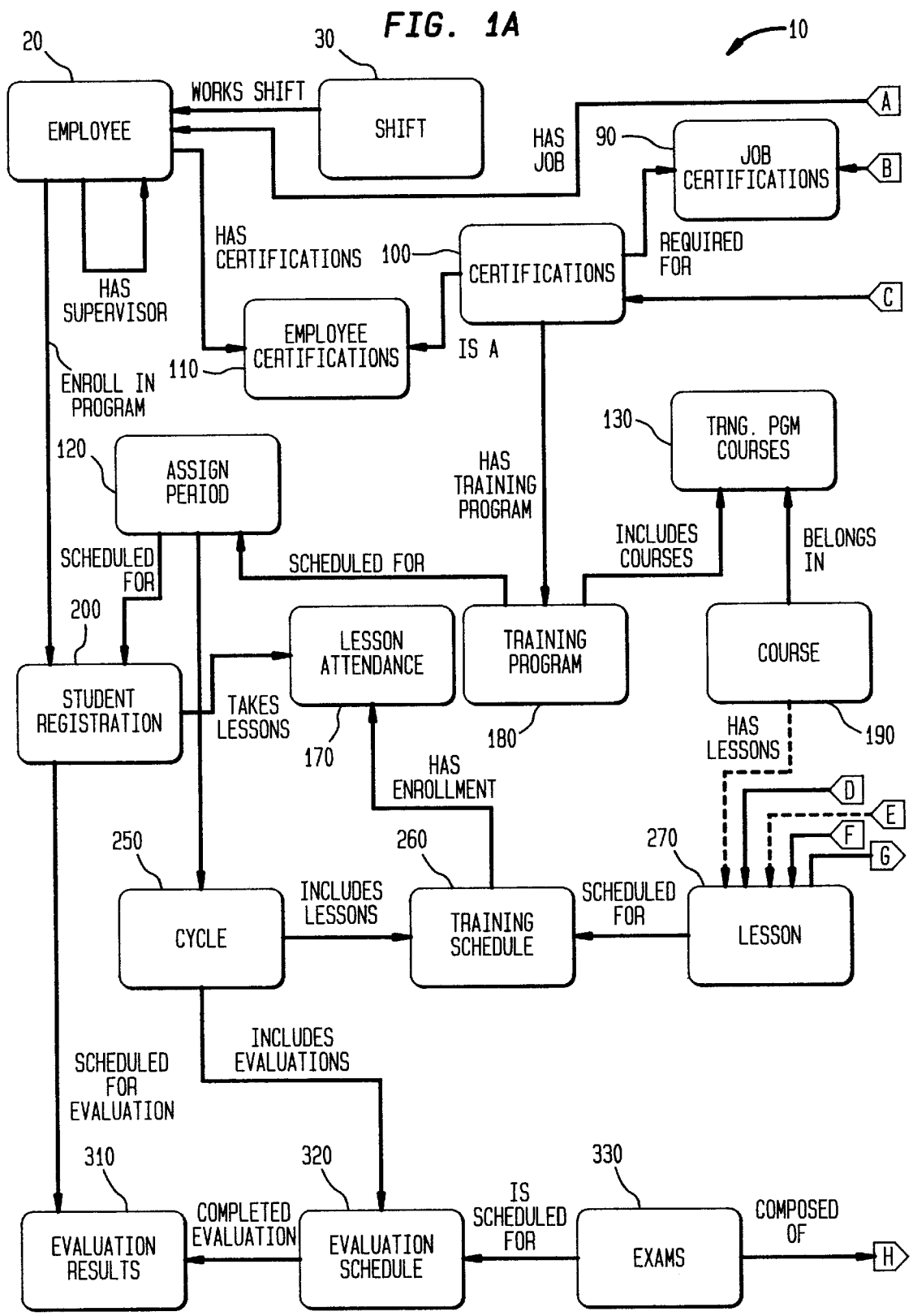

COMPUTERIZED EMPLOYEE CERTIFICATION AND TRAINING SYSTEM

The applicant claims a filing date of Jul. 17, 1996 based on the filing of a provisional application by the applicant having a Ser. No. 60/015,722.

BACKGROUND

One key to successfully operating a facility is the effectiveness of the training delivered to plant operations and support personnel. The character and quality of the instructors are critical elements of that effectiveness. Also crucial is supporting management and the instructors with tools that enable delivery of consistent, high quality, job related instruction and support associated record keeping and audit requirements.

Existing systems and methods for work force planning and occupational readjustment, have traditionally concentrated mainly on the manual analysis of an individual's skills, with little or no emphasis on a related job analysis or needs analysis of potential employers. Additionally, the current state of the art fails to link training resources and new training requirements as part of an overall approach.

In highly regulated industries such as nuclear energy, airline, hazardous waste management, etc., one of the requirements placed upon operators is to ensure that all personnel are in-fact qualified to perform each of the duties that they are assigned to perform. For example, nuclear facilities are governed according to the regulations outlined in 10 CFR 55 (Jan. 1, 1993), et seq. These regulations establish procedures and criteria for the issuance of licenses to operators and senior operators of utilization facilities (nuclear facilities) licensed pursuant to the Atomic Energy Act of 1954, as amended, or section 202 of the Energy Reorganization Act of 1974, as amended, and 10 CFR 50 (Jan. 1, 1993).

Although formal training programs, job experience and an understanding of procedural requirements can help an employee, there is little systematic help available to provide an assurance to an employer that the employee possess the necessary certifications and licenses to perform a particular task or duty, and is in compliance with all applicable statutes and regulations.

U.S. Pat. No. 4,020,468 issued to Silver, et al. on Apr. 26, 1977, discloses a system which relates to gaining knowledge of specific apparatus, tools, or processes. It serves to teach a technician how to troubleshoot and repair an apparatus and functions primarily as a training device.

U.S. Pat. No. 4,671,772 issued to Slade, et al. on Jun. 9, 1987, discloses a training tool designed to be used by students to develop specific skills based upon an application provided stimuli. The stimuli are altered based on user responses to output that is generated by the training tool.

U.S. Pat. No. 4,863,384 issued to Slade on Sep. 5, 1989, relates to an interactive learning approach rather than the development of training to enhance required competence of the workers assigned to specific jobs.

U.S. Pat. No. 5,208,869 issued to Holt on May 4, 1993, describes an application specific to the banking field and is not directed to personnel training activity. This system is directed to a character recognition tool directed specifically to written numerals.

U.S. Pat. No. 5,251,294 issued to below on Oct. 5, 1993, describes a mechanism for the association of stored text based information. The association is based upon common attributes of the text based data which are or maybe classified by context. Information may then be retrieved by context in a method that is similar to methods employed by typical Internet search engines or library locator applications. The mechanism does not provide the user with a graphic rich display of relationships that exist between an employee and the tasks, skills, learning objectives and referenced based objectives and criteria that are required for adequate job competence.

U.S. Pat. No. 5,270,920 issued to Pearse, et al. on Dec. 14, 1993, refers to a system designed to produce a schedule for training air crew or others based upon available training services and user initiated requests. It does not provide for the integration of training materials with parent job competencies or tasks and does not maintain a history of the completion of training.

U.S. Pat. No. 5,371,673 issued to Fan on Dec. 16, 1994, discloses a system to evaluate "verbal" responses or text based responses in relation to some defined criteria. It provides a pseudo-intelligent tool for the determination of perception as reported by a sample population.

U.S. Pat. No. 5,416,694 issued to Parrish, et al. on May 15, 1995, discloses a system for assessing an individual's acquisition of specifically identified skills and abilities and the relationship of those skills and abilities to an identified occupation. The system as described in the Parish patent may be characterized as an attempt to embody an employee selection process into a computer based system.

SUMMARY

Against the foregoing background, it is a primary object of the present invention to provide a user with a graphic rich display of relations that exist between an employee and the tasks, skills, learning objectives and referenced based objectives and criteria required for a defined minimum competence.

It is contemplated that the present invention can be implemented utilizing a variety of designs and languages. In one contemplated embodiment the present invention is developed in an object oriented fashion and comprises the following functions:

- a qualification module including performance information, compliance information, certification information, and evaluations;
- a job module having at least one job description having a job identifier, it is contemplated that each employee has a link to at least one job identifier;
- a training module having training material and at least one training lesson, at least one course, each course having at least one lesson plan, the course is linked to at least one training lesson and associated with at least one employee, the training materials are associated with one or more training lessons to facilitate access to the training materials, the training module also includes a compliance means for evaluating the compliance information as it relates to each employee;
- a cycle includes at least a single lesson that is to be presented in at least one scheduled session, a cycle means for linking an employee to one scheduled session; and
- a task module having at least one task linked to a job identifier, the task contains a reference to at least one skill, at least one optimal training method and at least one enabling objective. An enabling objective is the result of correlating multiple related skills into an objective statement. The enabling objectives are linked to questions and the questions are linked to procedures or references. The enabling objective provides a link associating a particular task with a particular question. In addition, the question may be linked to zero or more exams.

The present invention is a tool to support the efficient management of employee development, training and performance improvement in a performance/competency based organization. The present invention offers an integrated system that provides one application that instructional staff, human resource professionals, managers, line supervisors and employees may access to develop training materials, career paths or to check on current status or qualifications and performance.

It is contemplated that the present invention may be used as a training development tool. The present invention provides full support for job and task analysis; learning objective development; standards and processes; objective, reference based test items; examinations and evaluations; training program identification and content description; training scheduling and training/evaluation documentation and reporting. It is contemplated that a process for skills identification will be added at a later time.

Because the present invention includes certification maintenance tools, training plans may be developed based on a known or anticipated requirement of existing qualified personnel. Since every position has requirements/certifications, and every employee has a job, the continuing training needs for any position can be quickly identified and training plans can be more rapidly and effectively developed as compared with systems that are currently available.

It is an object of the present invention to provide a mechanism for the identification of skills and licenses which an employee needs to become competent or certified for a given trade or job. It is another object of the present invention to identify and report, for each employee job/task combination, that the employee is in compliance with all applicable statutes and regulations related to training, development and licensing of personnel.

It is another object of the present invention to perform a task analysis resulting in an importance factor being assigned to each task.

It is another object of the present invention to provide a system that permits an administrator to create independent schedules and assign an employee based on actual job and knowledge requirements.

It is a further object of the present invention to accept user supplied data to a modeled process. The modeled process permitting display of the data in varying degrees of detail. The present invention further provides the user with a graphic rich display of the relationships that exist between an employee and the tasks, skills, learning objectives and referenced based objectives and criteria required for job competence. It is contemplated that the structures within the present invention are highly refined and stored as business objects and classes which ensure that the administrator follow the modeled process and allows for the most efficient method for employee development.

It is yet a further object of the present invention that the employee skills function utilize the competency based model. The competency based model presumes the predetermination of skills compiled as competencies and represented in the present invention by validated certifications.

It is contemplated that every position or job has specific duties, tasks and skills associated with the position or job; and mastery of those skills may be represented by accepted standards of certification. As such, the certifications may be directly associated with responsibilities that employees hold. Another object of the present invention is to instantly identify the level of qualification of any employee and verify that he or she is in fact qualified to perform assigned duties. This reporting capability serves to reduce the employer's exposure to the liability of unqualified workers performing tasks which are potentially hazardous to the employee themselves, to others and to the environment.

BRIEF DESCRIPTION OF THE DRAWINGS

For a more complete understanding of the present invention and for further objects and advantages thereof, reference may now be had to the following description taken in conjunction with the accompanying drawings in which:

FIG. 1A is a high level data model representing the general processing of the present invention;

FIG. 8 also includes screens required to develop associations between the cycle and other entities;

FIG. 9 also includes screens required to develop associations between the training program information and other entities;

FIG. 13 also includes screens used to develop an association between questions and evaluations;

DESCRIPTION OF THE PREFERRED EMBODIMENTS

The following definitions are presented to facilitate an understanding of the structure and purpose of the various entities in the present invention:

"Activity type" is a general condition under which tasks are performed or expected to be performed.

"Certification" is an accepted and validated representation of competence.

"Course" is a general body of required knowledge or collection of instructional topics with attributes that are common to each instructional topic.

"Cycle" is a subset of a program-period during which specific instructional activities are scheduled. A cycle is similar in character to a semester.

"Duty Area" is a functional area of responsibility, physical system, or category of tasks.

"Employee" is a person employed or retained by an organization to perform work. An employee, for purpose of reporting, may also be a visitor to the organization requiring some degree of training prior to entering an area having restricted access (i.e. radiation areas, biohazard areas, hazardous material areas, security areas, etc.).

"Evaluation" is a scheduled assessment of student behavior, psychomotor ability, skills mastery or cognitive ability.

"Job" is a description of responsibility comprising several discreet units of work.

"Job Requirement" is a certification that an employee must hold to be capable of satisfactory job performance. More particularly, the job requirement describes skills that the employee must perform competently to be considered successful in the assigned job.

"Lesson" is a unit of instruction associated with a course. Lessons are linked to a course for curriculum development purposes. The lesson is available to link to other programs without respect to the discipline of the program.

"Period" is an instance of a program having an established beginning and ending date. Period also refers to a global period of time during which various instructional events may occur.

"Program" is a representation of an external document that specifies content or sequence of training which may or may not have a minimum duration for completion.

"Shift" is a convenient method to group and identify employees having similar assignments or work schedules.

"Task" is a discrete unit of work, with a definable beginning and ending point, described and associated with a selected job.

"Task Navigator" is a graphical tool used to visualize the relationship between jobs, tasks and related information.

Figure 1B:
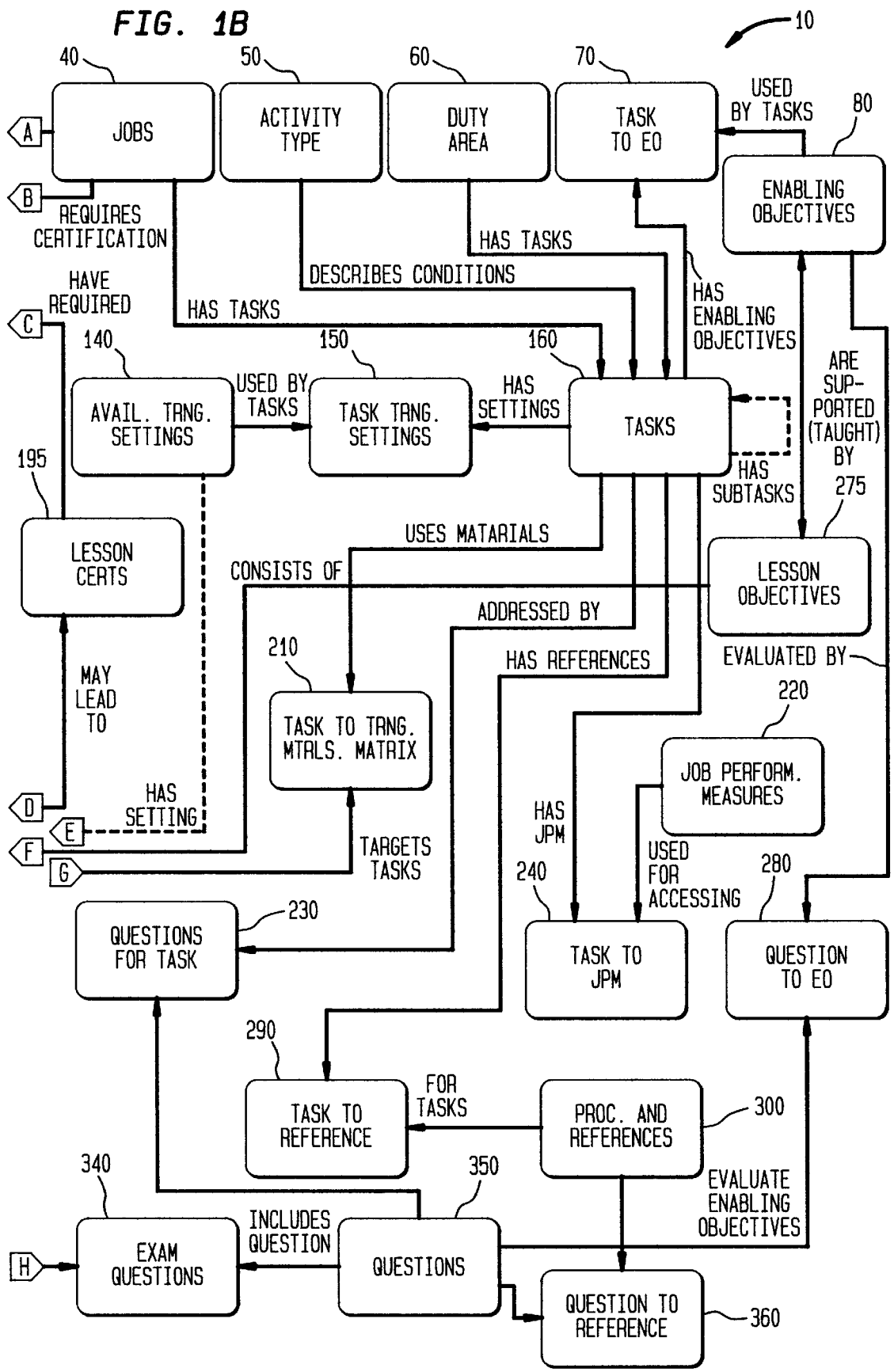
FIG. 1B is a continuation of the high level data model as shown in FIG. 1A.
Figure 2:
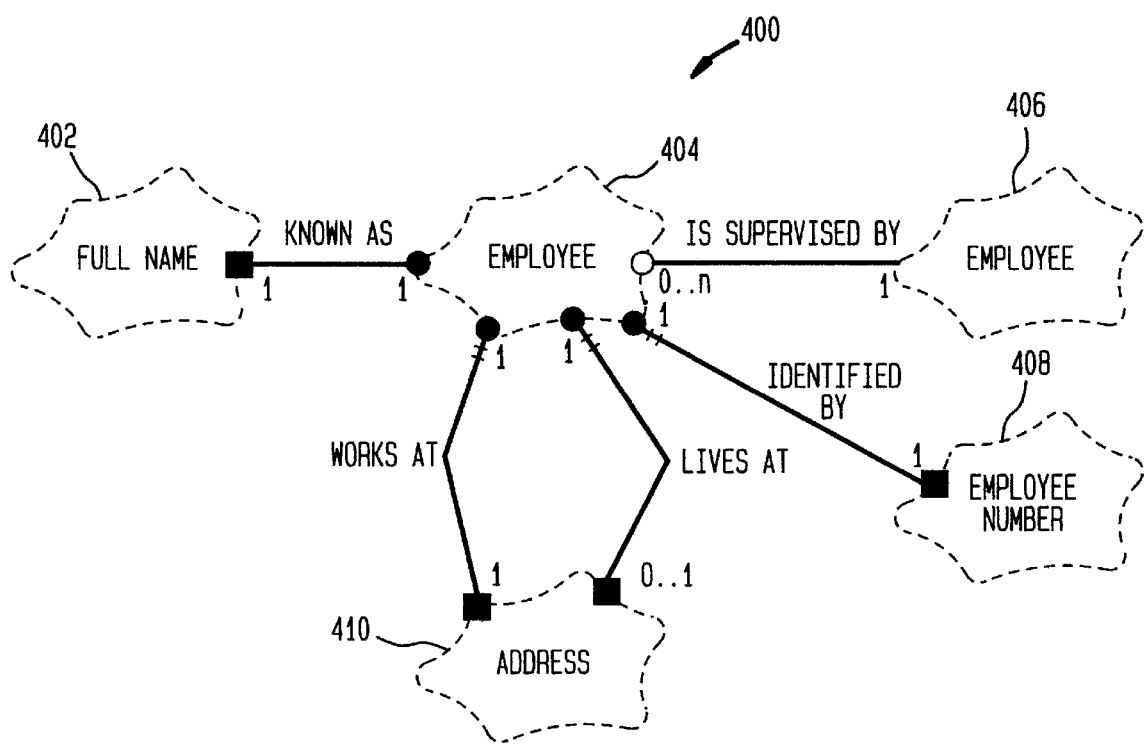
FIG. 2 is a class diagram which includes those classes designed to contain employee specific information.

In one implementation of the present invention the following hardware and software configuration was proposed as a minimum standard in order to take full advantage of the systems capabilities:

Hardware component—Server
  IBM PS2 Model 95
  190 MB available RAM
  XT 486 Mhz processor speed (X86 family 5 mod 2 stepping 5)
  2.2 GByte hard disk capacity (or greater)
Software component—Server
  Windows NT 4.x O/S
  Oracle 7.3 for WindowsNT including:
    SQL *Net for TCP/IP
    SQL *Loader
    SQL *Plus for Windows
Communication
  T3 fiber to all sites then TCP/IP over Token Ring/ Ethernet cards
Workstation configuration
  Compaq Deskpro (or equivalent)
  P166 Processor
  24 MB RAM (12 MB RAM minimum)
  Minimum 60 MB available hard disk space
  Window95 or WindowsNT 4.0 Client O/S The class diagram referred to in FIGS. 1A–1B is shown generally by numeral 10. Employee table 20 serves as the repository for all information about an employee critical to a training department and qualification processes. The unique identifier for this file is an employee's social security number.

It is contemplated that the Employee table 20 may be populated either manually by the user or via an independent process which is Open Database Compliant 2.0 (ODBC) compliant. The present invention is designed to be ODBC 2.0 compliant. An external application that adheres to the process constraints of the present invention is the preferred method of maintaining synchronous data with primary employee data within an organization's human resources department. The design of the system prevents deletion of any employee record from Employee table 20 if the targeted employee has completed any training events as documented within the system.

A Shift table 30 serves as a method to store identified employee group or work period identifiers. The Shift table 30 allows the user to identify a work group to which an employee belongs. When the Shift table 30 is used the employee may belong to zero, one, or many work groups. The Shift table 30 must be populated prior to assigning shifts or groups to employees.

A Jobs table 40 captures identifying information of the various positions, responsibilities and jobs to which employees are assigned. The Jobs table 40 allows for an association of an identified position to employees requirements and tasks that are the "children" of the job(s). The Jobs table 40 must be populated prior to populating the employee table.

An Activity Type table 50 allows for an identification of the various activities prior to an identification of tasks.

Prior to the conduct of detailed task analysis, it is necessary to identify the various functional areas of interest. These areas are referred to as Duty Areas 60 and the entity 60 allows for the collection of critical information related to training such as identity of an area, subject matter expert and definition of the area. The Duty Areas 60 must be populated prior to the commencement of task analysis.

A Task to Enabling Objectives table 70 allows the user to associate enabling objectives with tasks that are supported by the enabling objectives. In the present invention, enabling objectives may be specific skills or hybridized skill statements. The table 70 is populated through the a Task Navigator, which allows for graphical association of enabling objectives with tasks.

Enabling Objectives 80 are skills statements or hybridized skills statements which support a performance of tasks or a transfer of required skills to a job candidate or incumbent. Each instance of an Enabling Objective 80 is identified during the task analysis process and each instance is entered into the system with supporting information such as an objective type, importance, edit dates and associated comments. The Enabling Objective table 80 must be populated before using the task, questions or other graphic navigators.

The Job Certifications table 90 is available to support the qualification and/or development processes within the present invention. For each job present in the current system it is necessary to identify and include a Job Certification 90. The table 90 is populated at the time a job is identified and provides a reference point for all qualification related features.

Certifications 100 are used to represent collected skills that comprise skill sets that are important to successful job performance. Certifications 100 may also be used to represent unique skill sets possessed by an employee but not associated with critical or core competencies of the organization's business. The Certification table 100 allows for classification of the skill sets and the definition of specific requirements relating to the maintenance of the skills. The table 100 functions as a reference table for all qualification related features. The table 100 must be populated prior to associating requirements with jobs or certifications to employees.

The Employee Certification table 110 may be updated upon successful completion of training events, or on verification of employee certifications. The table 110 indicates collective skill sets possessed by the employee and current status of the skill sets. The employee certifications features include a capability to renew and extend the validity of certifications, and warnings are provided to a user of actual and potential ramifications of consecutive extensions relating to expired employee certifications.

Tracking certifications is of critical importance to regulated industries and is supported by an employee certifications history entity (not shown). The employee certification history entity allows for the system to monitor consecutive extensions and permits a record of the identity of the person who authorized the extension and the date when the authorization occurred.

The Training Period 120, also known as an Assign Period, is an essential part of scheduling within the present invention methodology, as it is a record of each instance of a training program. The Assign Period identifies a beginning and ending date for each training program instance. The Assign Period must be populated prior to the scheduling of training or enrollment of students.

Training Program Courses 130, also known as Program Lessons, is used to define a curriculum for a given program. Based upon the association of the Training Program object 180 and the Lessons object 270, a user is able to define a required content for any sequence of instruction as dictated by the training program description.

The Training Program Courses 130 need not be used in order to support the processes of present invention, but is available as a "bridge" to development of automated scheduling of training events.

Available Training Settings table 140, also known as Training Settings, permits a user to define training selection, training locations or general training venues. When developing training events, a specific venue (laboratory, simulator, computer room, etc.) may be required to successfully transfer skills to the student. This table 140 allows for the control of the identifiers used while permitting flexibility. Completing information required by Available Training Settings table 140 is a prerequisite for development of Lesson 270 information or use of association tools (Navigators) which access the Lesson 270 information.

Once the task analysis process is completed by the instructional technologists, then designers are able to create the associated training materials. During development of these materials, it is important to know the venue(s) in which training is to be conducted. A Task Training Settings table 150 allows a user to associate tasks with specific training venues or selections as an aid to event planning and materials development. The table 150 is reliant upon Training Settings 140 and Tasks 160 for key information.

The Tasks table 160 is central to the training systems design module of the present invention and contains identifying information for tasks performed within an organization. The identifying information includes key attributes of a task (duty area, activity type, importance factors, etc.) as well as a terminal objective statement and "special requirements" that may be associated with successful task performance.

As the definition implies, tasks will most likely have varying degrees of complexity. Some tasks require such complex skills that the skills themselves may be considered "daughter" tasks. To support this reality, the Task table 160 and associated rules have been developed to allow a recursive link between tasks. It is contemplated that each task contained in the Task table 160 may have one parent together with many children or siblings. In order for a parent-child relationship to exist, the child task must consist of compound-complex skills required to successfully complete a critical element as defined in the parent task.

The Tasks table 160 must be populated prior to taking advantage of any training development features in this embodiment of the current invention, as all training materials arise from tasks and resulting analysis. It is contemplated that tasks 160, enabling objectives 70 and questions 350 are often developed simultaneously. Associations between the Tasks table 160 and other entities within the model, make possible true impact reporting from any point within employee training, development and qualification processes. The Tasks table 160 is reliant upon Activity Type 50, Duty Area 60 and Jobs 40 for its existence.

When training has been delivered to support job qualification or the attainment of improved skills, it is essential to document the completion of the training. The Lesson Attendance table 170 is coupled to and related with Training Schedule 260, Period 120, Training Program 180 and Employee 20 objects to support the documentation. Lesson Attendance 170 is indirectly tied to the Certifications 100 and Employee Certifications 110 through a relationship, or a potential relationship, that may exist between Certifications 100 and Lessons 270. This relationship is not shown in FIGS. 1A–1B. The indirect relationship allows for an automatic issue or renewal of employee certifications 110 providing this action is permitted at the time the Certification 100 is defined.

To provide both positive and negative reporting capabilities on training completion while maintaining a normalized database, the Lesson Attendance table 170 is populated at the time of student enrollment is entered into the Training Schedule table 260.

The Training Program entity 180 provides for the identification of the content descriptions and requirements (external documents) which define training content and serve as the starting point for all Training Schedules 260 via the Period 120.

The user enters program identification information and required duration information for each administered program prior to defining a Training Schedule 260.

The Course table 190 provides a method of categorizing training, to be delivered to students, into topics or areas of knowledge. The table 190 must exist prior to the definition of any Lesson 270 and may be used to develop general curriculum statements.

Certifications 100 are representations of the skills required to successfully perform Tasks 160 or do a Job 40. Skills are transferred to the student via a construct known as a Lesson 270. Some Lessons 270 are sufficiently defined that successful completion of the Lesson 270 occurs only after mastery of required skills. Therefore, Lessons 270 may result in a direct award or renewal of Certifications 100.

The Lesson Certifications table 195 allows a user to define Lessons 270 that may be used to issue or renew Certifications 100. It also serves as a tool to identify weaknesses or deficiencies in specific curriculum developed by an organization.

The Student Registration table 200 may exist outside of the system as a "virtual" object in that students enrolled in scheduled training become a part of or are registered to a training program by virtue of instructional content. While processes support the creation of a Student Registration Table, direct enrollment of Employees 20 to scheduled Lessons 270 and Scheduled Evaluations 320 is a preferred method and is employed in one embodiment of the current invention.

Student registration is a function of Employees 20, Periods 120, Programs 180, Training Schedule 260 and Evaluation Schedule 320.

A frequent request of process auditors relates to materials used to transfer skills that are required to perform Tasks 160 associated with Jobs 40. In a performance-based approach to training development and delivery, the materials used to transfer the skills are inexorably linked to the training materials.

A Task to Training Materials Matrix 210 allows a user to associate, using the Task Navigator, Lessons 270 and Tasks 160. Further, utilization of the entity 270 assists in development of specific curriculum statements and task training completion documentation. The Task Navigator is a graphical tool used to visualize the relationship between Jobs 40, Tasks 160, and related information.

The Job Performance Measure (JPM) table 220 allows for the identification of activities used to either transfer integration of skills or assess an employee's ability to function at higher cognitive, psychomotor or affective levels. The JPM 220 is developed as the result of the Enabling Objectives 70, Tasks 160 and Procedures and References 300 associated with the performance of a Job 40. A user will enter JPM identification, author and description according to protocols established by the organization.

The Questions for Task table 230 allows for an association of referenced-based objective criteria or Questions 350 and the Tasks 160 to which the Questions 350 are related. In the methodology of the present invention, no question may be considered valid unless the question directly supports a Task 160 or an Enabling Objective 80.

The Questions for Task table 230 is populated by a user via a graphical association and display tool such as the Questions Navigator. In addition to providing documentation for questions supported by an identified task, this table 230 permits rapid identification of questions affected by changes to task specific attributes.

JPMs 220 are related to Tasks 160 as the JPMs 220 arise from a combination or application of related Tasks 160 under various conditions. The Task to JPM table 240 allows a user to employ a Task Navigator to create and display an association between a JPM 220 and several Tasks 160 which are supported by and associated with a given JPM 220.

Similar to other associations within the present methodology, the Task to JPM table 240 assists an instructional designer in developing program content and the instructional technologist in rapidly identifying items which may be affected by (or have an affect on) the JPM 220. A JPM 220 with a poor performance trend may indicate a weakness in the Training Program 180 content, Available Training Settings 140 or inappropriate reinforcement by line management of stated training values and goals.

The Cycle table 250 permits the user to divide the larger Training Period 120 into manageable units of time. Rather than limiting the user to months or quarters, which may not be suitable for rotating shift worker training schedules, the Cycle 250 is defined at the time of creation by the Period 120 and selected beginning and ending dates.

Cycles 250 are reliant on the Period 120 and Training Program 180 objects and are prerequisites for Training Schedules 260 and Evaluation Schedules 320. The Cycle 250 also provides for comments pertaining to Cycle table 250 content if desired.

The Training Schedule 260 is developed by an association of Lessons 270 with a defined program-period Cycle entity 250. The user will select, based on established criteria or protocols, those Lessons 270 to be delivered to a student. When the Training Schedule 260 has been created, the user may then enroll Employees 20 thereby creating a Lesson Attendance 170 entry for each Employee 20.

A transfer of skills is accomplished through a variety of methods including classical classroom training. Regardless of the method used, each method may be thought of as a Lesson 270 developed from Enabling Objectives 80 that directly support a satisfactory performance of Tasks 160. The Lesson table 270 allows the user to identify each lesson and track the existence of the Lesson 270 on the system. This capability is critical to operating facilities in a regulated industry. The skills presented in each Lesson 270 may provide support for a defense in a wrongful damage lawsuit and also serve as a useful tool to improve a workforce's skill set over a given period of time.

Lessons 270 rely only on the Course 190 to which they belong for existence but are a prerequisite for the Task Training Matrix 210, Training Schedule 270 and automated certification issue and renewal features.

Lessons 270 are developed from Enabling Objectives 80 which are related by subject area or Task 160. The Lesson Objective table 275 permits a user to identify Lessons 270 that support each of the Enabling Objectives 80 and provides a method to identify weaknesses within training development processes or programs.

When Questions 350 are developed and used as part of a qualification for a Job 40. The Questions 350 must be directly supported by the skills required to do the Job 40. Failure to meet this requirement invalidates written examinations and may be grounds for grievances or other complaints. Further, Questions 350 that are not supported by skills imparted to trainees provide only negative returns on the training investment. The skills which are imparted to trainees can be identified by an Enabling Objective 80 to Lesson 270 relationship.

The Question to Enabling Objective table 280 allows the user, via the Questions Navigator, to associate each Question 350 with one or more Enabling Objectives 80. The available association also serves as a method to validate questions when task analysis data is amended.

In order for a Task 160 to be valid, the Task 160 must have some standard of performance associated with it. In industry, these standards are generally referred to as Procedures and References. The Procedures and References table 300 allows a user to associate and depict a relationship between various Procedures and References and the Tasks 160 performed by the various Jobs 40. This operation is accomplished with the aid of a Task Navigator.

The Task to Reference table 290 also provides for Referential Impact Reporting which is used to identify a potential training audience resulting from the change to a standard, reference or procedure. The Procedures and References table 300 includes regulations which have far-reaching potential to aid in the prevention of injury, damage to assets or safety of the public. By correlating the References 300 to Tasks 160, the Tasks 160 to the Jobs 40 and the Jobs 40 to the Employee 20; a user is able to ensure all appropriate personnel are notified in the event of a standards change.

The Procedures and References table 300 allows a user to identify specific references, procedures and standards that may apply to the training related materials, jobs or personnel. This table 300 must be populated prior to developing a Task to Reference 290 relationship or a Question to Reference 360 associations. The Procedures and References table 300 may also be used to monitor a revision status and author of a specific procedure or reference.

In many cases, evaluations are conducted to support job qualification or to assess an employee's attainment of skills. It is essential to document an employee's performance from all available evaluations. The Evaluation Results table 310 is related to and associated with the following tables Evaluation Schedule 260, Period 120, Program 180 and Employee 20. The association between the Evaluation Results 310 and the enumerated tables 260, 120, 180, and 20 are used as support for the Evaluation Results 310. For reporting and processing purposes the Evaluation Results 310 are also associated with Exams 330, Exam Questions 340 and Questions 350.

The Evaluation Results table 310 is populated at the time of student enrollment to Scheduled Evaluations 320. The population is processed in this manner in order to provide both positive and negative reporting capabilities on Evaluation Results 310 while maintaining a normalized database.

The Evaluation Schedule 320 permits a user to assign specific Exams 330 to an established Training Cycle 250. If evaluations and lessons are both defined for an established Training Cycle 250, then at the time of student enrollment records are simultaneously created in Evaluation Results table 310 and Lesson Attendance 170.

Exams 330 or Examinations are developed to assess the level of skills mastery of all employees. Typically, exams are thought of as written tests. However, any employee assessment tool may be referred to as an Exam 330. Exams 330 must be identified and named within the present invention scheduling, however the Examination does not have to be built within the application until the Exam 330 is ready to be implemented. This allows greater flexibility for the instructional designer and provides a mechanism within the system for tracking an intent and authorship associated with each Exam 330. The Exam table 330 is also used to assist in the identification of individuals who are authorized to generate Exams 330 from the system or to edit an assembled Exam 330.

The Exam Question table 340 is a construct of Exams 330 and Questions 350. The Exam Question table 340 is populated via the process in the current system referred to as an Exam Builder. The Exam Builder allows a user to create, sequence, compare and assess the content of examinations.

Access to the Exam Question table 340 provides a user with an ability to obtain statistics on examination variance and question use frequency. This feature assists a designer in accurately and objectively assessing student skill mastery.

A Questions table 350 provides for an identification of referenced based objective criteria in order for validating job competence based on cognitive skills. A user enters identifying information such as level of difficulty, time to complete, author, usage and other primary attributes. The user then enters a question and answer text together with the location of any graphic files to be included with the question at the time of question generation. Question generation results from Exam generation via Exam Questions 340 and Exams 330.

As each Question 350 is derived from analyzed Enabling Objectives 80 and supports Tasks 160, each Question 360 is supported by Reference Materials 300. The Question to Reference table 360 allows a user to identify the various references which substantiate a question and also provide for a rapid method of identifying questions that are impacted by a challenge in standards or references.

Figure 3:
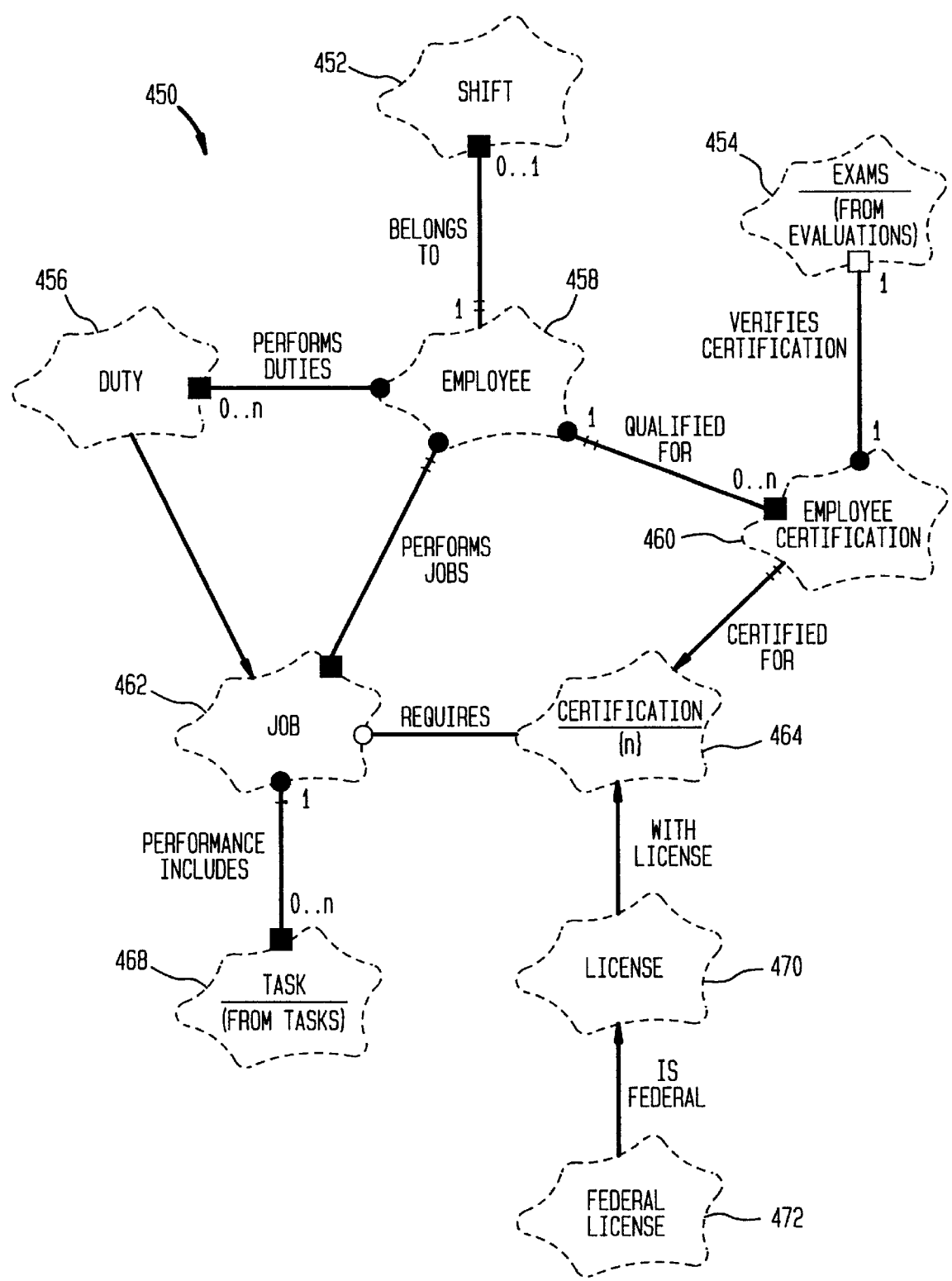
FIG. 3 is a class diagram which includes those classes which are designed to map the relationships that exist between employee and job requirements.
Figure 4:
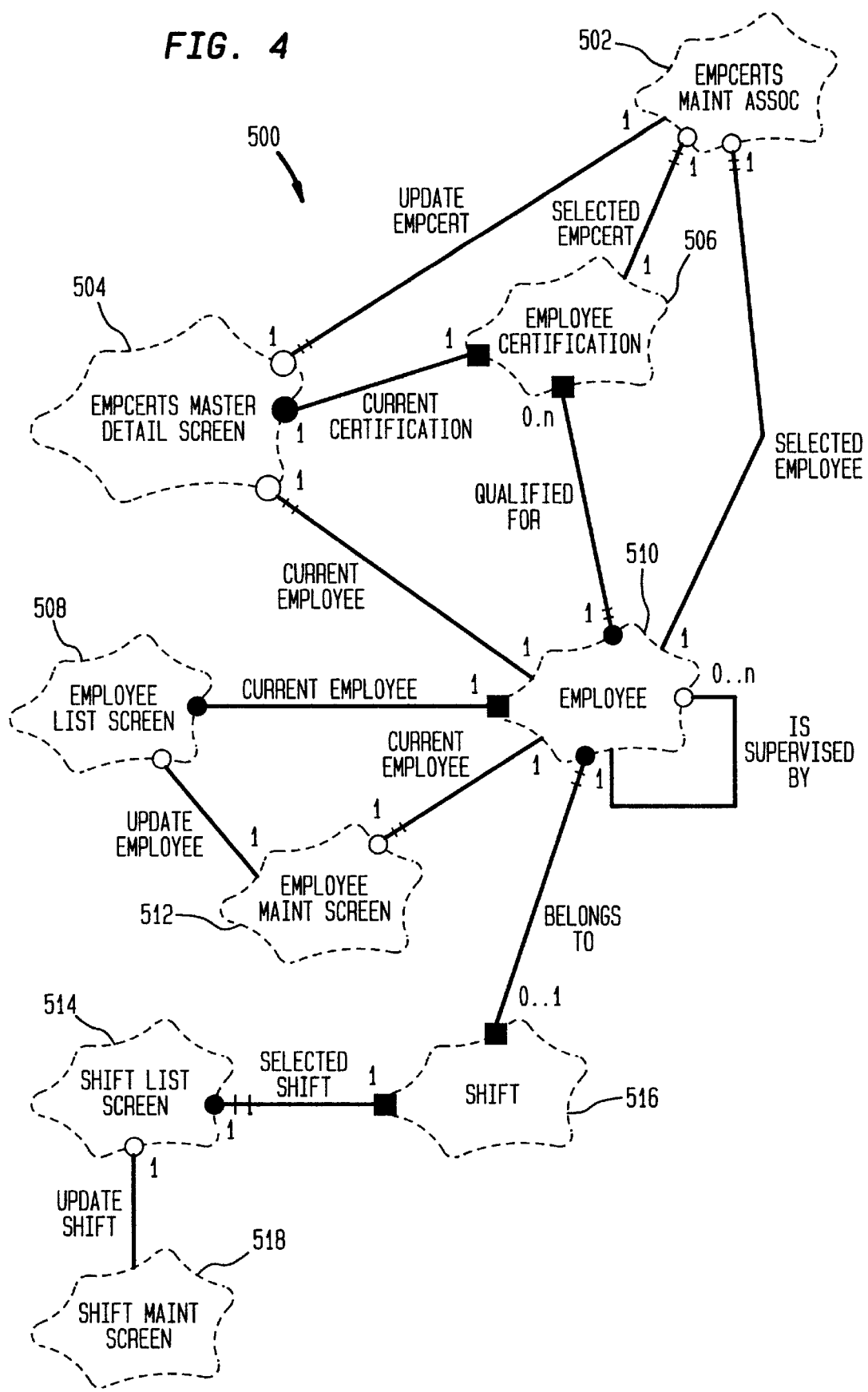
FIG. 4 is a class diagram which includes Graphical User Interface (GUI) classes providing a user an interface to view and update employee information. Also depicted in FIG. 4 are the screens required to develop associations between other entities.
Figure 5:
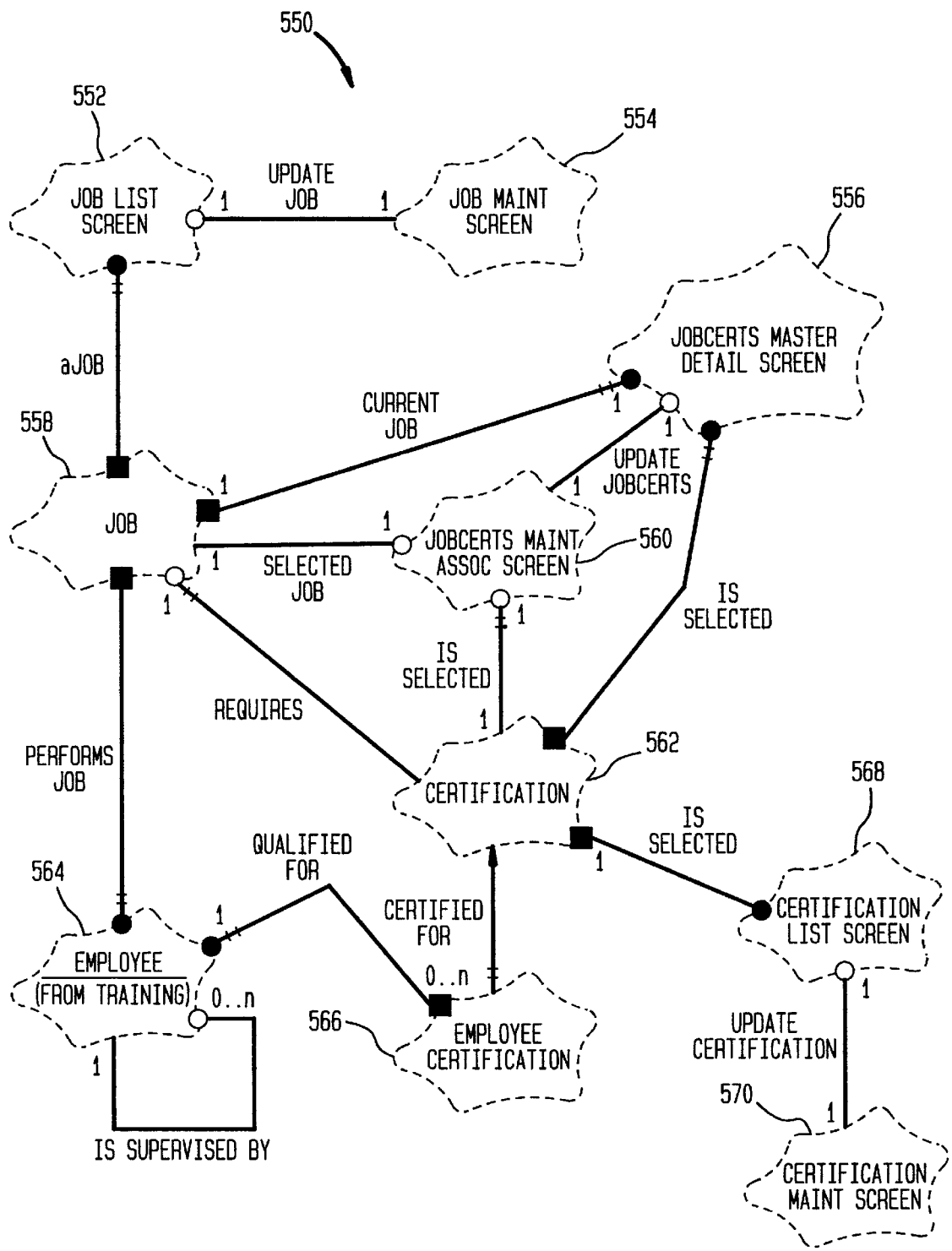
FIG. 5 is a class diagram which includes GUI classes providing a user an interface to view and update job and certification information. Also depicted in FIG. 5 are the screens required to develop associations between the entities enumerated herein.

The class diagram referred to in FIG. 3 is shown generally by numeral 450. A Shift 452 is a collection of Employees 458 with common job requirements. The Shift 452 is responsible for managing the referenced set of employees, and the Shift 452 can be viewed as a collection that is inheriting attributes typical of this type of entity.

Each Employee 458 must be assigned a Job 462. At the present time the system restricts the number of jobs to one per employee. Each Employee 458 may have zero or more duties in addition to his or her primary Job 462. It is contemplated in the future to expand this facility to incorporate multiple jobs per employee. A Job 462 may be viewed as a logical grouping of Tasks 468 of which the employee is responsible to perform. A Job 462 is a type of collection.

Certification 464 is a class that provides a certification template that contains such information as certification requirements and expiration periods. Certifications 464 represent and are linked to Licenses 470 and 472 and certificates (not shown) that are required to perform a selected Job 462. Certifications 464 require that an employee demonstrate competency through training and evaluation, before a certification is awarded. The Certifications 464 manage a relationship between Job 462, Training Programs (not shown), and Employee Certification 460.

A License 470 is a specific type of Certification 464 and manages License 470 related information such as license number. A Federal License 472 is a license relating to federal issue or requirements. The Federal License 472 manages such specific information as the serial number or docket number.

Employees 458 are required to be certified to perform certain Jobs 462. The Employee Certification 460 manages relationships and events required to track an Employee's 458 Job 462 requirements and Certifications 464. The function of the Employee Certification 460 includes determining rectification requirements as well as demonstrated employee competencies which are determined from access to Exam 454 results.

Figure 6:
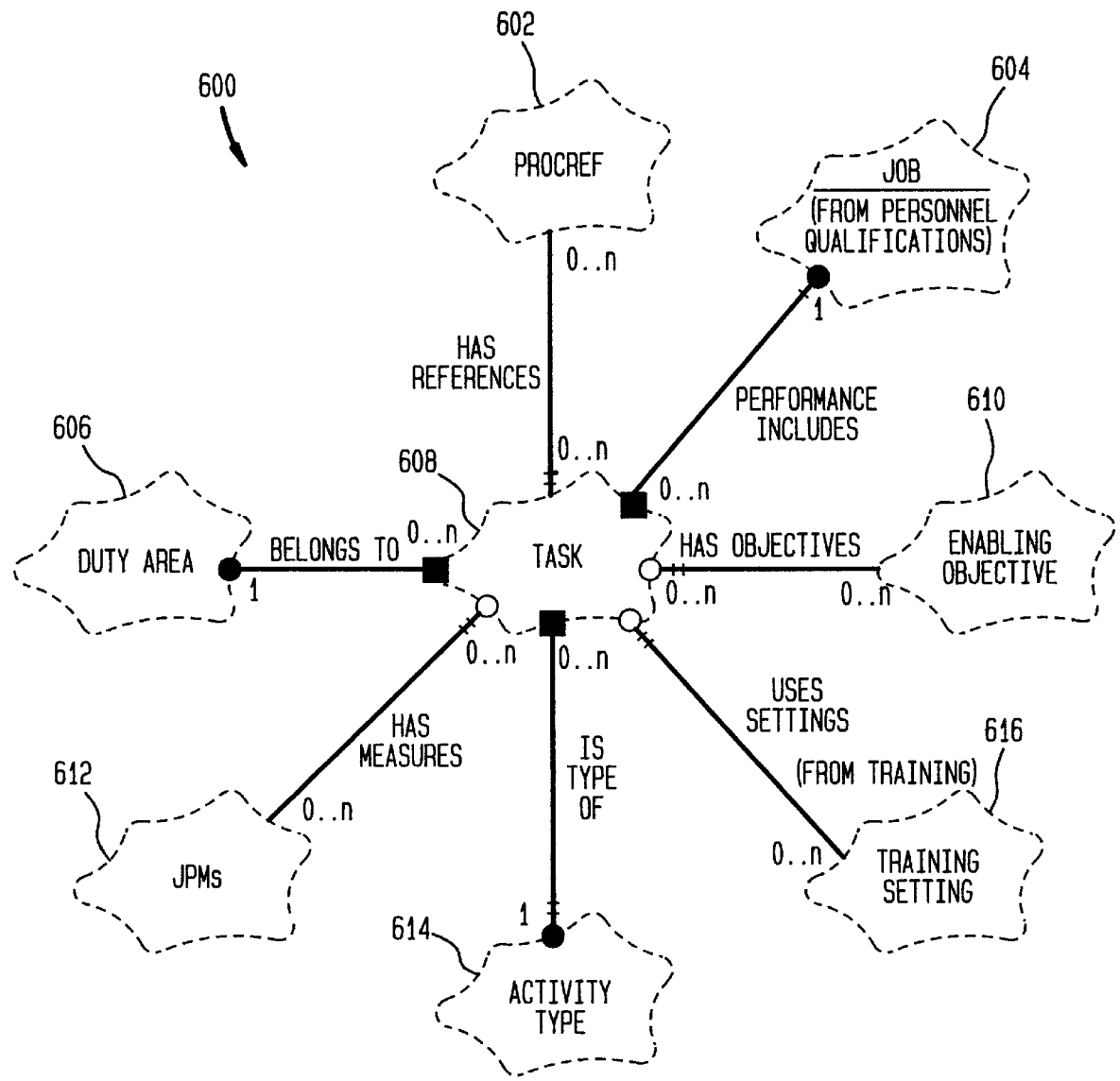
FIG. 6 is a class diagram which includes those classes which are responsible for managing various aspects and characteristics of task performance.

The class diagram referred to in FIG. 6 is shown generally by numeral 600. A Duty Area 606 is a system collection of duties or functional responsibilities. A Duty Area 606 may be viewed as a logical grouping of Tasks 608 based on functional area. A Duty Area 606 can be viewed as a type of collection. Activity Type 614 is a general classification of a task(s) conditional que(s). For example, a Task 608 may be defined as a maintenance task, an abnormal task, an emergency task, etc. An Activity Type 614 may be viewed as a logical grouping of Tasks 608 based on a general classification. An Activity Type 614 is a type of collection.

Tasks 608 are a central focus of the current invention. A Task 608 is an activity or group of activities which employees are required to perform. The Tasks 608 manage relationships between Tasks 608 and ProcRef 602, Job 604, Enabling Objective 610, Training Setting 616, Activity Type 614, Job Performance Measures 612, and Duty Areas 606.

Enabling Objectives 610 are a logical grouping of similar skills and knowledge required to perform a Task 608. An Enabling Objective 610 is defined by a category, description, domain (Blooms's Taxonomy) and degree. The Enabling Objectives 610 manage attributes as well as relationships between Tasks 608 and questions (not shown) that are resident in the database of the current system. Questions are also associated with and created for an Enabling Objective 610.

A Job Performance Measure (JPM) 612 is used to determine an employee's ability to perform a selected task under various conditions. A JPM 612 includes a description and some history information. The JPM 612 manages these attributes as well as relationships between Tasks 608 and JPMs 612.

The ProcRef 602 is a class that includes descriptions of all procedures, standards or other references that support job performance. The class 602 includes a description and some history information. The class 602 manages these attributes as well as relationships between Tasks 608 and ProcRefs 602.

Figure 7:
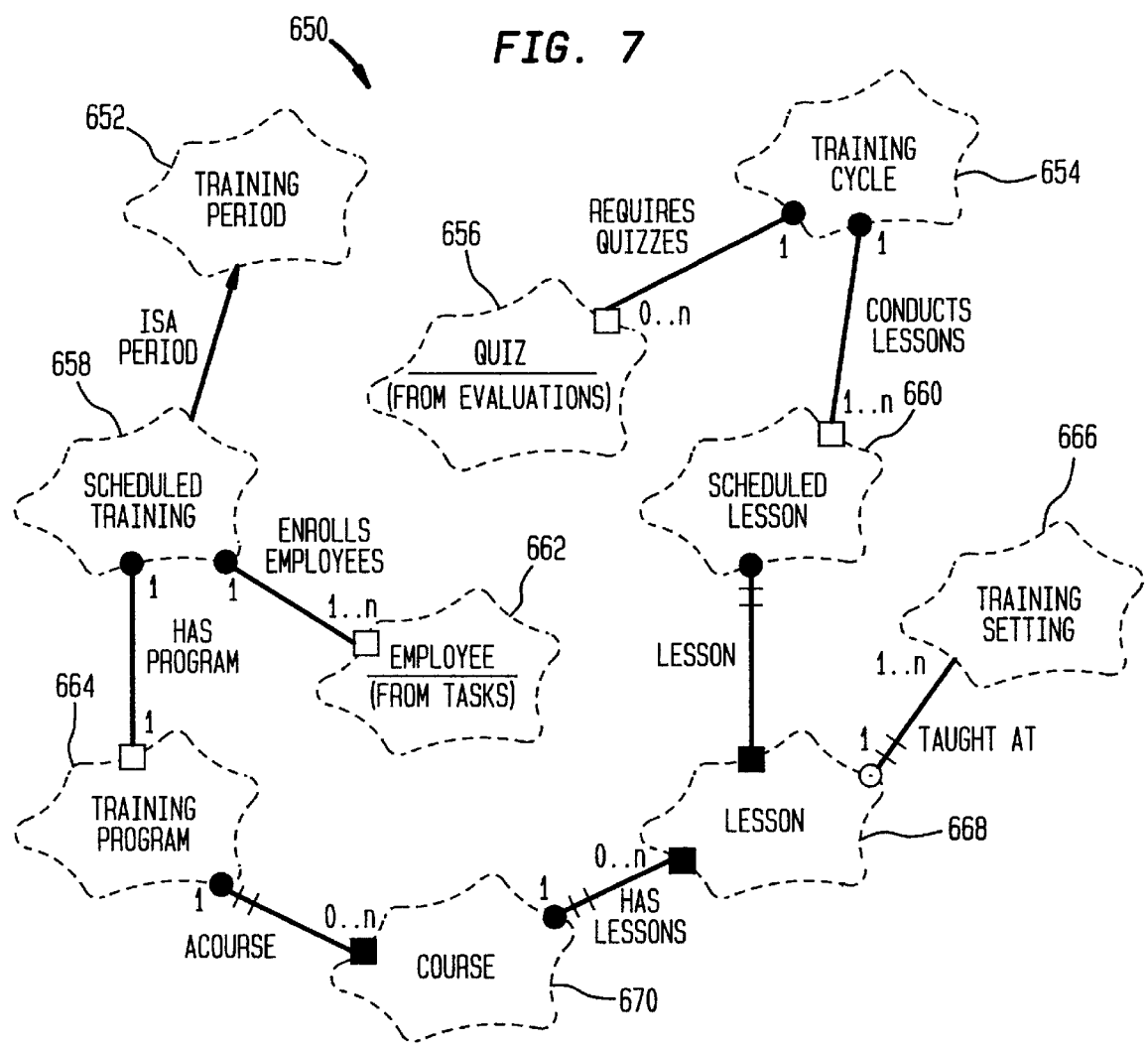
FIG. 7 is a class diagram which includes those classes that are directly related to creating, maintaining and administering a training program.
Figure 8:
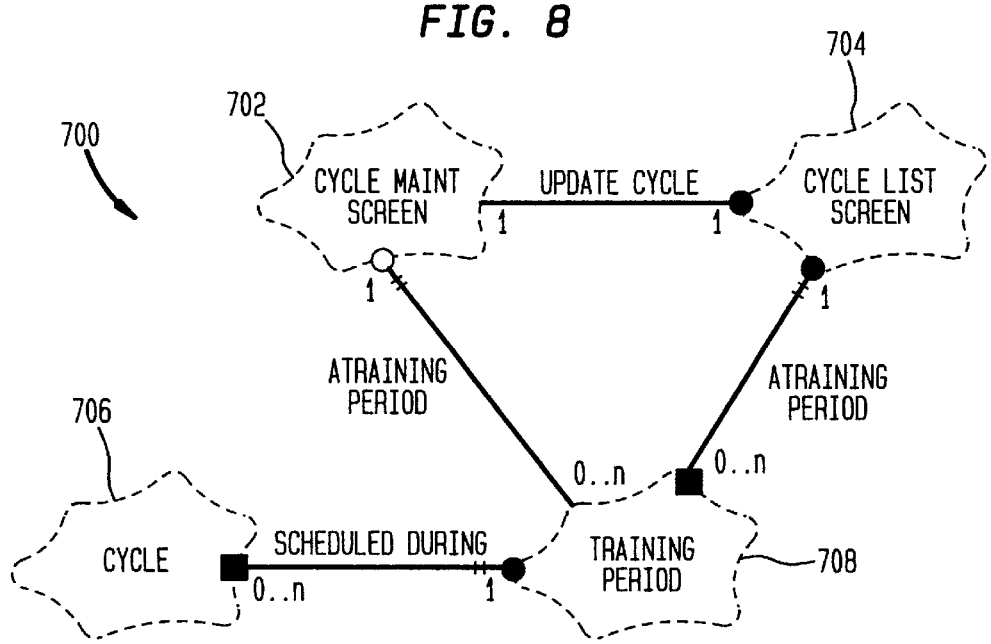
FIG. 8 is a class diagram which includes GUI classes providing a user an interface to view and update cycle information.
Figure 9:
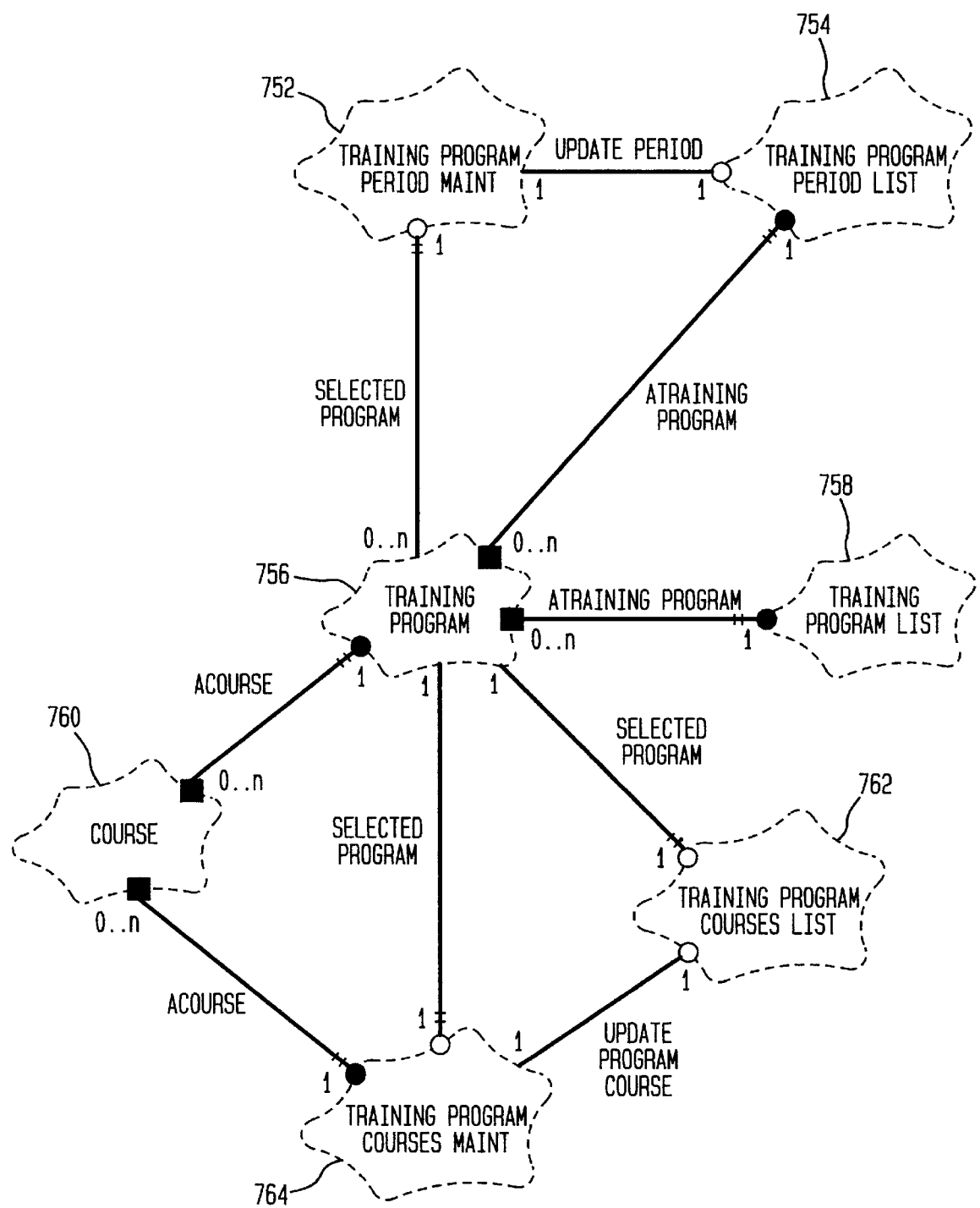
FIG. 9 is a class diagram which includes GUI classes providing a user an interface to view and update training program information.
Figure 10:
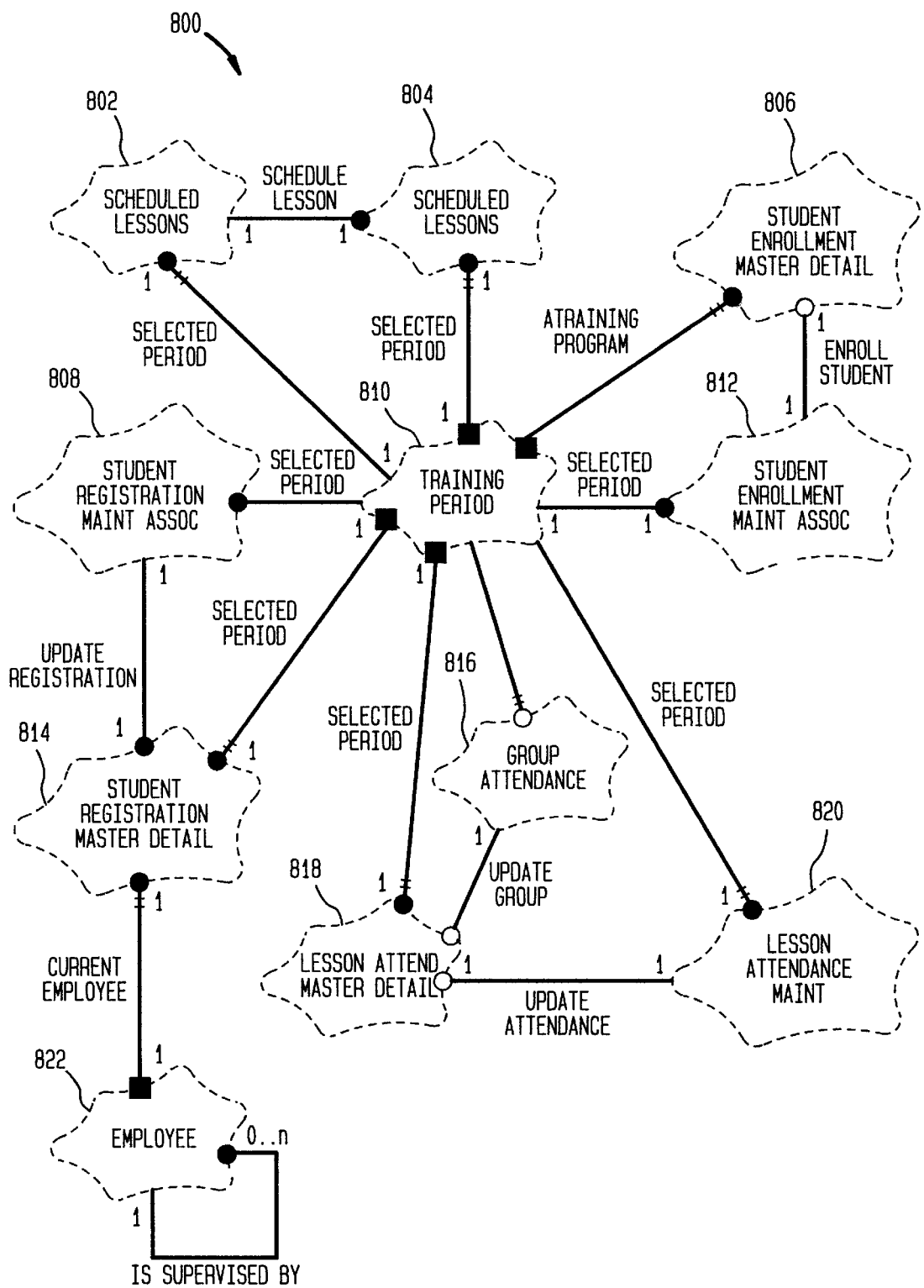
FIG. 10 is a class diagram which includes GUI classes providing a user an interface to view and update training program scheduling information.
Figure 11:
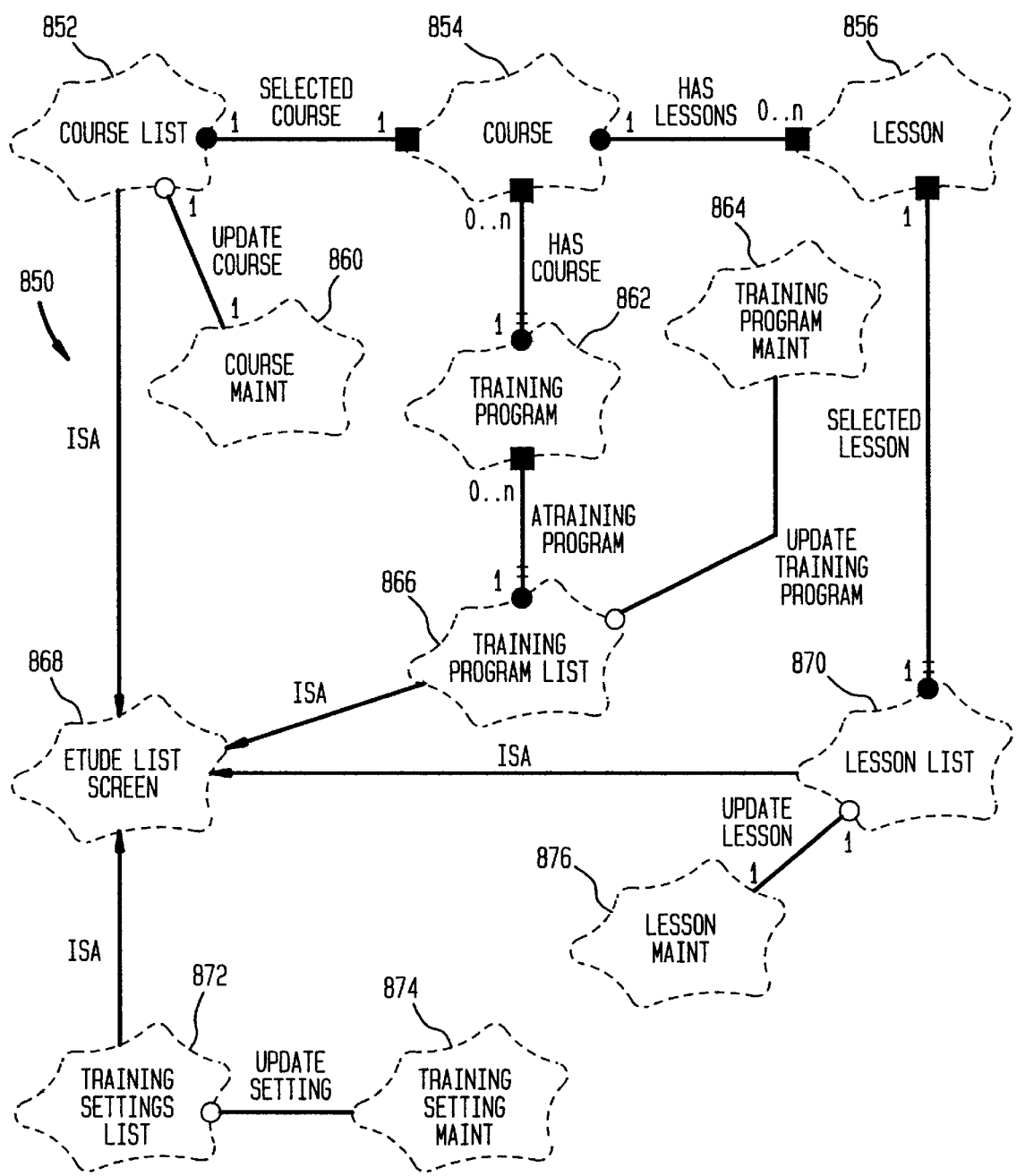
FIG. 11 is a class diagram which includes GUI classes providing a user an interface to view and update training program, course, lesson and training setting information.

The class diagram referred to in FIG. 7 is shown generally by numeral 650. A Training Setting 666 may define a classroom, lab, simulator or some other facility used for delivering training. A Lesson 668 is defined as specific task based training material. The Lesson 668 manages creation and deletion of lessons, including associating lessons to tasks (not show) and identifying Training Settings 666.

A Course 670 is comprised of a general body of knowledge. A Course 670 may be viewed as a group of Lessons 670 under a common title. A Course 670 is a type of collection. A Training Program 664 is assembled to provide either initial or qualification training. Training Programs 664 are designed to provide an employee with the training required to be certified to perform his or her job. Training Programs manage training information and associated relationships including Courses 670 and Certifications (not shown).

A Training Period 652 includes a beginning and ending date and is used to organize Training Cycles 654. A Training Period 652 has a collection of Training Cycles 654. A Training Cycle 654 may have zero or more Quizzes 656 associated with the Training Cycle 654. The Quizzes 656 may be scheduled periodically throughout the Training Cycle 654. A Training Cycle is a subset of a Training Period 652 and occurs with the Training Period's 652 beginning and ending dates and is used to schedule lessons and evaluations within a scheduled training program. Scheduled Training 658 is a type of Training Period 652 that has a Training Program 664 associated with the Scheduled Training 658. A Scheduled Lesson 660 is a type of Training Cycle 654 that has Lessons 668 associated with the Scheduled Lesson 660.

Figure 12:
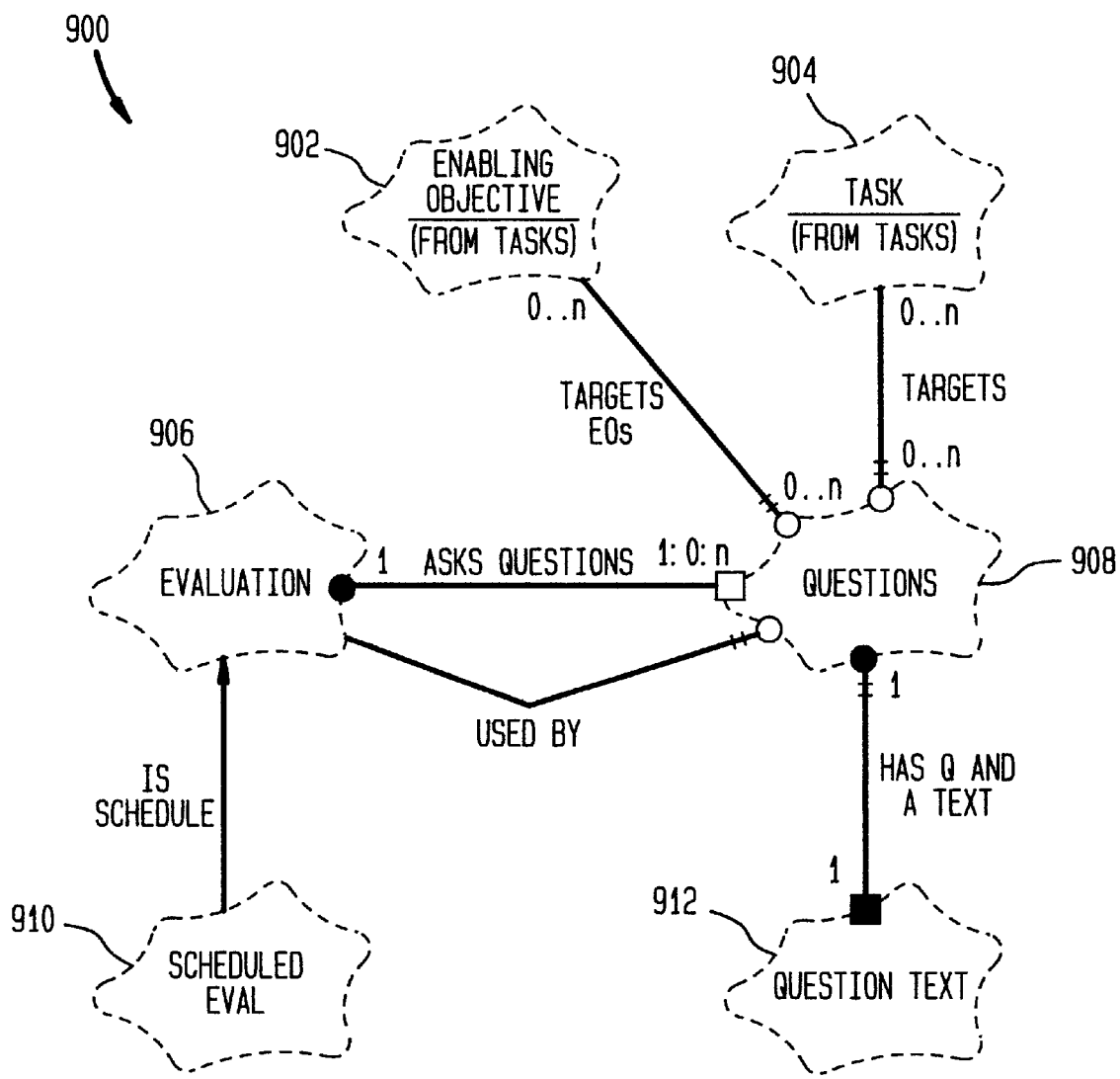
FIG. 12 is a class diagram which includes classes used to create and maintain student evaluation.
Figure 13:
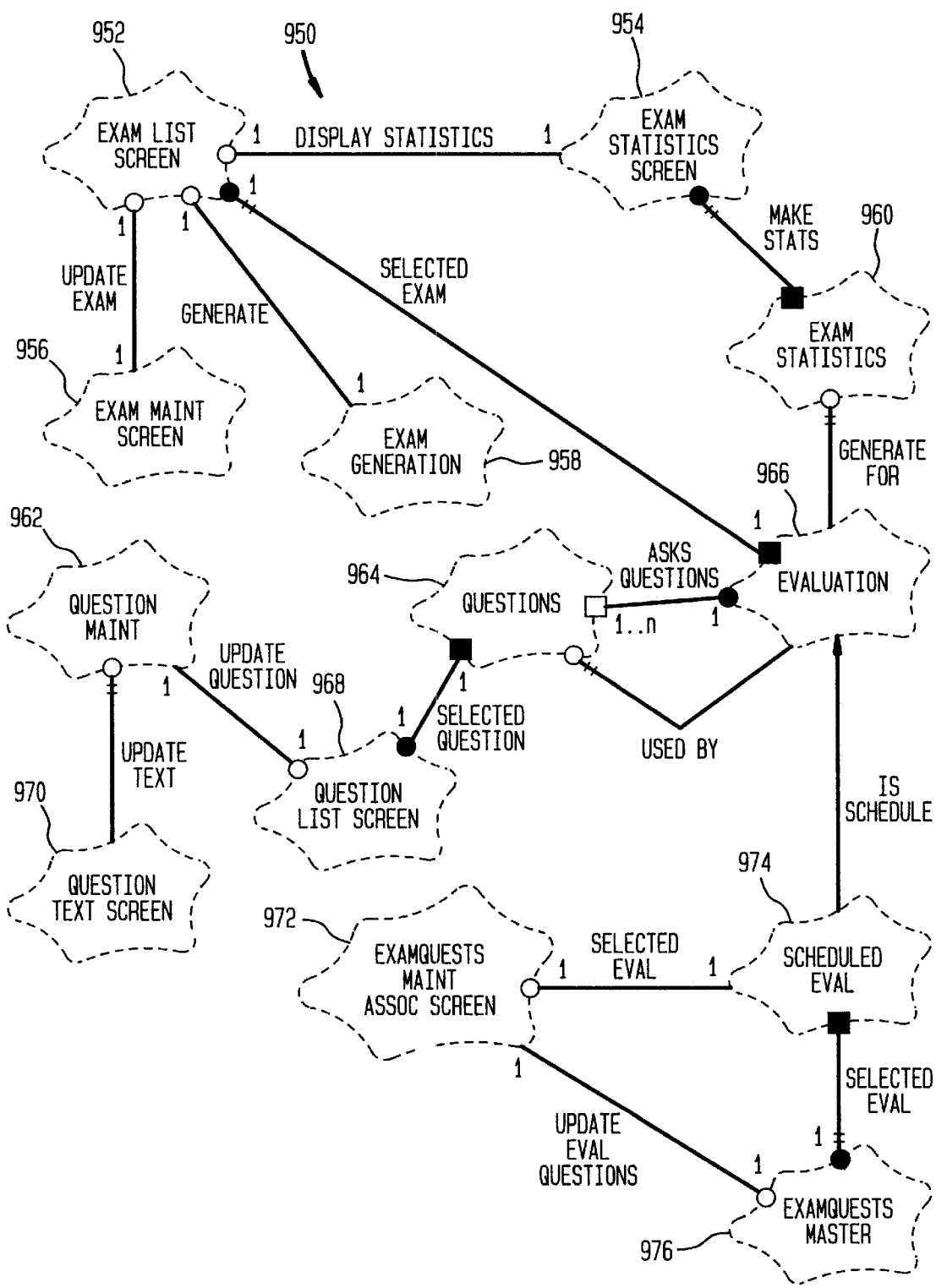
FIG. 13 is a class diagram which includes GUI classes providing a user an interface to view and update evaluation and question information.
Figure 14:
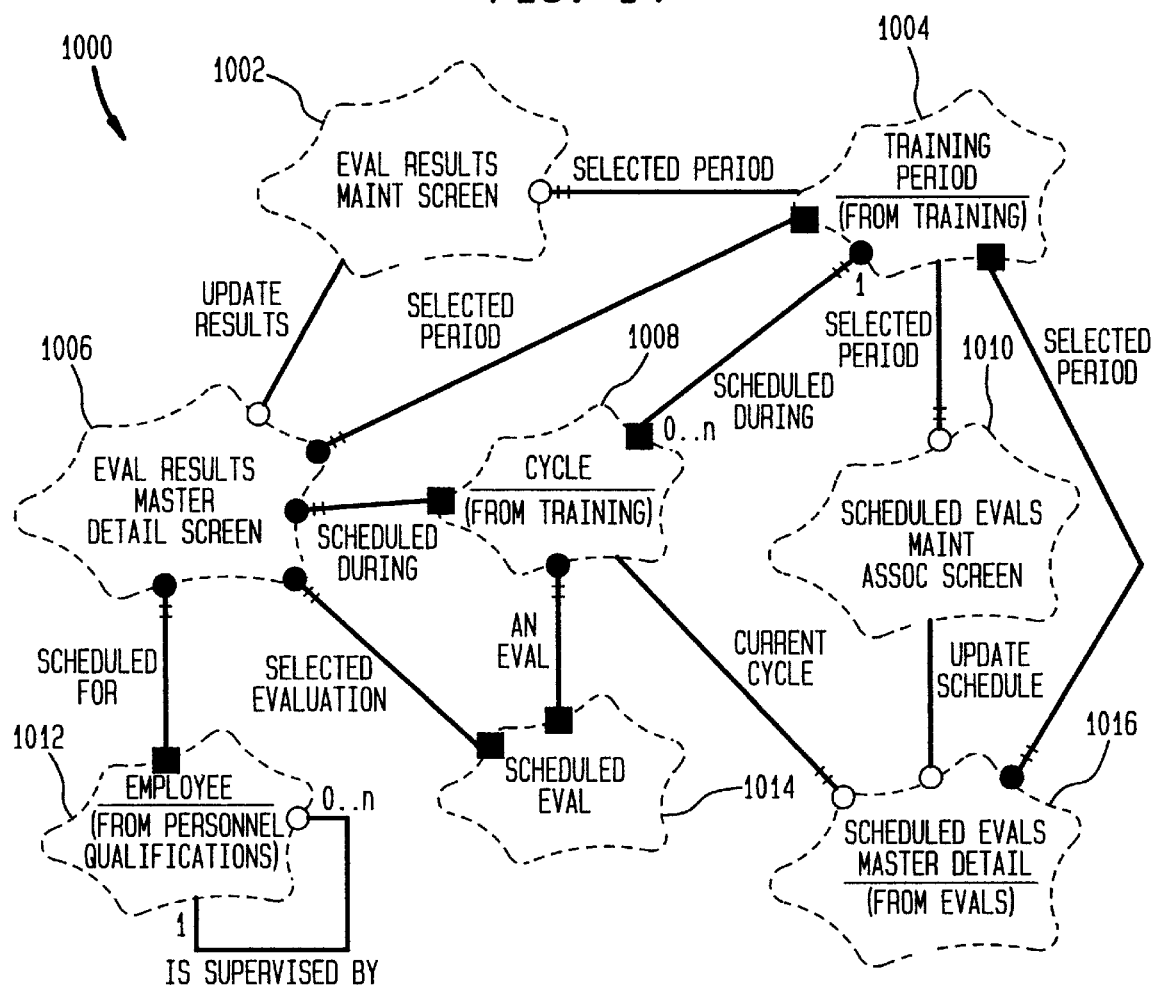
FIG. 14 is a class diagram which includes GUI classes providing a user an interface to view and update evaluation schedules and results information.

The class diagram referred to in FIG. 12 is shown generally by numeral 900. An evaluation master is the evaluation template from which all Evaluations 906 are generated. The evaluation master can be viewed as an evaluation without a schedule or student associated with it. Evaluation 906 questions are drawn from the Questions table 908.

The Question table 908 stores questions and Question Text 912 along with additional related information. The Question table 908 is also associated with Tasks 904 and Enabling Objectives 902. Information from these tables 902 and 904 are used in selecting Questions 908. Question graphics are not stored within the current system. However, names of files that contain graphics may be stored with a Question 908. The Question Text 912 contains question and answer text as well as a filename for any associated graphics. Question Text 912 makes available an ability to store and retrieve question and answer text. The question and answer text are stored in the same database field and must be separated by a special character.

A Scheduled Evaluation 910 is created from an Evaluation 906, but includes an individuals score and a date taken. An Evaluation 906 is given when required to certify an individual. The Evaluation 906 is usually given at an end of a training program.

Figure 15:
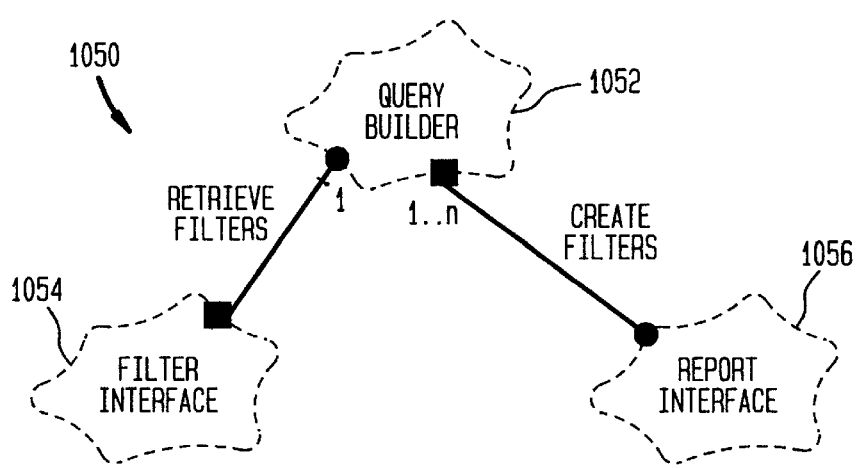
FIG. 15 is a class diagram which includes classes designed to permit a user to create and apply filters dynamically to reports produced by the present invention.
Figure 16:
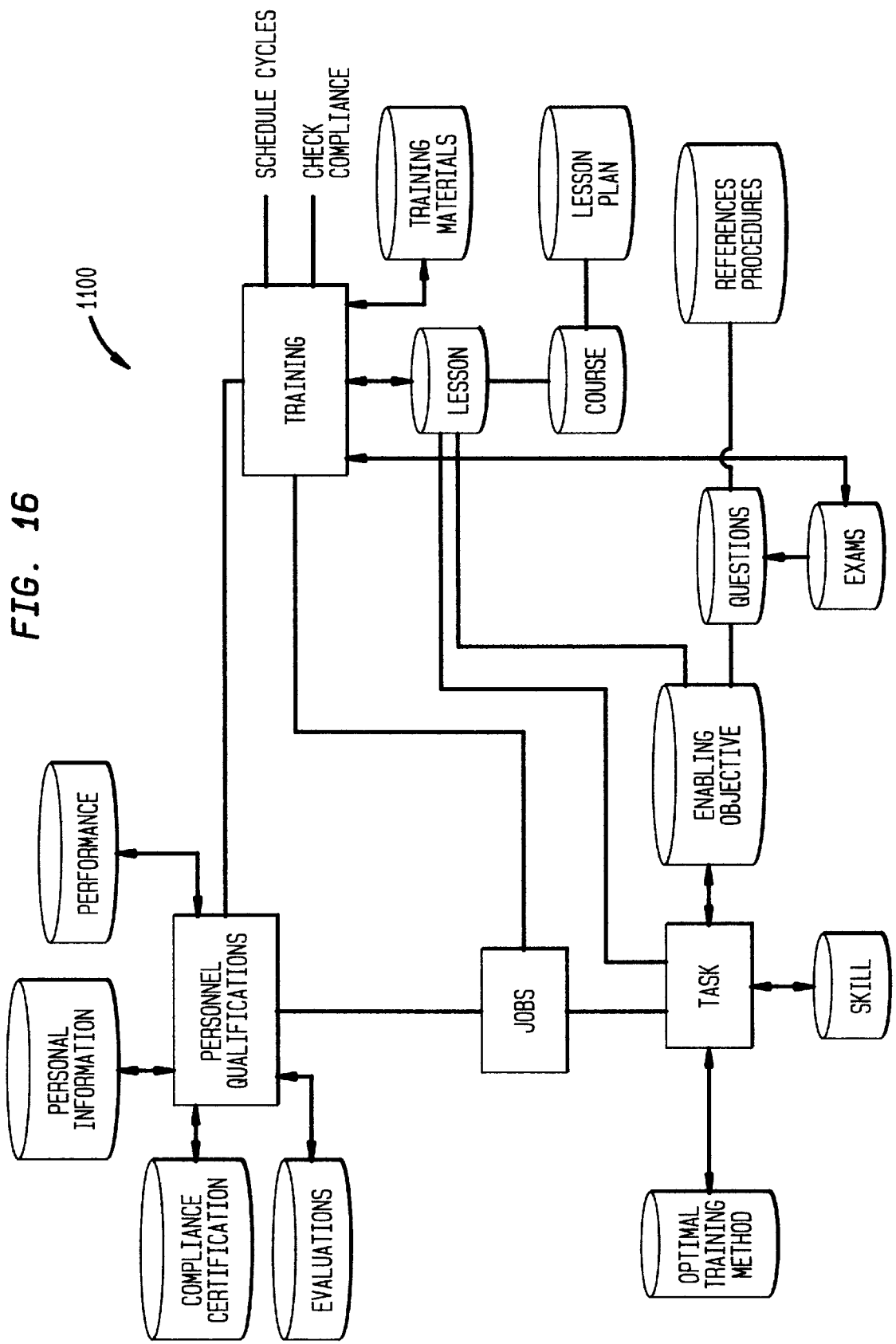
FIG. 16 is a process flow diagram depicting one embodiment of the present invention.

The class diagram referred to in FIG. 15 is shown generally by numeral 1050. A Report Interface 1056 is a designated report driver accessed and used in conjunction with the current system. A Filter Interface 1054 allows a user to specify a set of filters to be applied to information contained in the current system. The Query Builder 1052 is used to create and maintain data window queries. The Query Builder 1052 retrieves SQL statements from data windows and modifies the statements according to an active set of user defined filters. The Query Builder 1052 uses the Filter Interface 1054 to accomplish the retrieval of SQL statements.

The reader's attention is directed to the aforementioned papers and documents filed concurrently with this specification in connection with this application and which are open to public inspection with this specification, and the contents of all such papers and documents are incorporated herein by reference. The titles referred to in this paragraph are identified as follows: "Etude Methodology" authored by Gerald T. Hollingsworth in 1996; "Etude 3.1 Requirements Analysis"; "Version 2.0 User Guide—Etude" by Gerald Hollingsworth; and "Etude Training Program—Modules 1 through 5" authored by Gerald T. Hollingsworth in 1997.

What is claimed is:

1. An improvement in a computerized training system for use in industries wherein a person operating an industrial system is required to have at least one certificate or license issued by a government, the computerized training system being of a type having therein:
    (a) a qualification module comprising personalized input data indicative of personal information of at least one employee, the qualification module includes performance information, compliance information, certification information, and evaluations;
    (b) a job module having at least one job description having a job identifier, each employee having a link to at least one job identifier;
    (c) a training module having training material and at least one training lesson, at least one course having at least one lesson plan, the course is linked to at least one training lesson and associated with at least one employee, the training materials are associated with at least one training lesson for facilitating access to the training materials, the training module having a compliance means for evaluating the compliance information as it relates to each employee;

(d) a cycle having at least one lesson that is to be presented in at least one scheduled session, and a cycle means for linking the employee to one of the scheduled sessions; and (e) a task module having at least one task linked to the job identifier, the task containing at least one skill, at least one optimal training method and at least one enabling objective, the enabling objective is linked to at least one question such that the enabling objective provides a link from a particular task to a particular question, procedures and references and an exam, the procedures and references are linked to the questions and the questions may contain a link to an exam, the improvement in the system comprising:

(f) an associating module for associating one or more skills with a certification, associating one or more certifications with a job wherein an employee must possess the associated certifications in order to be qualified to perform the job.

2. An improvement in a computerized employee training system of the type having:

(a) a qualification module comprising personalized input data indicative of personal information of at least one employee;

(b) a job module being associated with the qualifications module;

(c) a training module having training material and at least one training lesson, the training module being associated with the job module and the qualification module; and (d) a task module having at least one task linked to the job identifier, the task containing at least one skill, at least one optimal training method, and at least one enabling objective, the enabling objective is linked to at least one question the improvement in the computerized training system comprising:

(e) an associating module for associating one or more skills with a certification and associating one or more certifications with a job whereby the employee must possess the associated certifications in order to be qualified to perform the job; and, (f) a certification checking module for periodically checking employee certifications having a status to identify and report a change in the status of the certifications, whereby the computerized training system is transformed into a computerized training and certification system.

3. A system as claimed in claim 2, further including procedures and references and an exam, the procedures and references is linked to the questions, and the questions may contain a link to at least one exam.

4. A system as claimed in claim 2, wherein the qualification module includes performance information, compliance information, certification information, and evaluations.

5. A system as claimed in claim 2, wherein the job module includes at least one job description having a job identifier, and each employee has a link to at least one job identifier.

6. A system as claimed in claim 2, wherein each course is linked to at least one training lesson and at least one employee.

7. A system as claimed in claim 4, wherein the training materials are linked to at least one training lesson for facilitating access to the training materials, the training module further including a compliance means for evaluating the compliance information for each employee.

8. A system as claimed in claim 6, further including a course including at least one training lesson, each training lesson further including an exam, the exam further including at least one question, and a lesson plan containing at least one course.

9. A system as claimed in claim 8, further including a cycle having at least a single lesson that is to be presented in at least one scheduled session.

10. A system as claimed in claim 9, wherein the cycle is to be presented in at least two scheduled sessions.

11. A system as claimed in claim 9, further including a cycle means for linking the employee to one of the at least one scheduled sessions.

12. A system as claimed in claim 4, further including a means for generating reports based on information available to the system.

13. A system as claimed in claim 12, wherein one report identifies compliance information associated with a selected employee.

14. A system as claimed in claim 12, wherein one report contains information needed to create independent schedules making it possible to assign employees to selected jobs based on the job requirements.

15. A system as claimed in claim 2, further including a means for identifying the skills that are necessary for the employee to become certified for a specified job.

16. A system as claimed in claim 2, further including a means for modeling data, the means for modeling permits a display of data that exists in the system in varying degrees of detail.

17. In a computerized method for training employees having the steps of:

(a) storing job positions including associated duties and each certification required by a government for each stored job position;

(b) storing tasks and associating each of the job positions with from zero to many tasks;

(c) storing standards and associating each task with a standard;

(d) storing an enabling objective for each of the tasks, the enabling objective being the result of correlating multiple related skills into the enabling objective, the enabling object representing skills that are required to successfully perform the associated task;

(e) validating an employee's mastery of the skills that are associated with the required tasks;

(f) storing training methods and associating each task with a training method;

(g) delivering training to employees which includes the steps of creating a cycle, scheduling instructional events, enrolling students, documenting attendance and documenting performance of each employee who receives the training; an improvement in the method comprising the additional step of certifying the employee, said certifying step further comprising the steps of:

(h) storing job positions including associated duties; and (i) storing and associating each certification required by a government for each stored job position with an employee; and (j) assessing the training material for compliance with user provided requirements.

18. A method as recited in claim 17, wherein the user provided requirements are government regulations.

19. A method as recited in claim 17, further including assigning at least one certification to at least one employee based on the mastery by each last said employee of one or more skills; associating one or more skills with a certification, associating one or more certifications with a job; and periodically checking employee certifications to identify and report a change in status of the certifications.

20. A method as claimed in claim 18, further including assessing skills of a prospective employee to determine which skills need to be learned by the employee in order to successfully perform an identified job; and assessing skills of current employees to locate the employee who possesses the most skills that are required to perform an identified job.

* * * * *